United States Patent

Kiuchi et al.

[11] Patent Number: 5,927,131
[45] Date of Patent: Jul. 27, 1999

[54] METHOD OF MANUFACTURING WIRE FOR USE IN A WIRE SAW AND WIRE FOR USE IN A WIRE SAW

[75] Inventors: Etsuo Kiuchi, Gunma; Kazuo Hayakawa, Takasaki; Kohei Toyama, Shirakawa, all of Japan

[73] Assignee: Shin-Etsu Handotai Co., Ltd., Tokyo, Japan

[21] Appl. No.: 08/822,099

[22] Filed: Mar. 20, 1997

[30] Foreign Application Priority Data

Mar. 26, 1996 [JP] Japan .................................. 8-096167

[51] Int. Cl.⁶ ...................................... B21C 1/00
[52] U.S. Cl. ................... 72/274; 29/424; 451/28; 216/89
[58] Field of Search .................. 29/90.01, 90.5, 29/424, 527.2; 216/88, 89, 100, 105, 106, 108; 451/28; 72/274

[56] References Cited

U.S. PATENT DOCUMENTS

| | | | |
|---|---|---|---|
| 2,293,810 | 8/1942 | Carleton | 204/34 |
| 3,896,043 | 7/1975 | Fadgen, Jr. | 216/100 |
| 4,246,322 | 1/1981 | Wall et al. | 428/670 |

FOREIGN PATENT DOCUMENTS

| | | |
|---|---|---|
| 63-309323 | 12/1986 | Japan . |
| 2-059109 | 2/1990 | Japan . |
| 4-210450 | 7/1992 | Japan . |
| 4-279212 | 10/1992 | Japan . |
| 51-006846 | 10/1992 | Japan . |
| 5-016066 | 1/1993 | Japan . |
| A-5-16066 | 1/1993 | Japan . |
| 168152 | 3/1982 | Netherlands . |

Primary Examiner—Kathryn Gorgos
Assistant Examiner—Thomas H Parsons
Attorney, Agent, or Firm—Oliff & Berridge, PLC

[57] ABSTRACT

A method of manufacturing wire for use in a wire saw used for slicing a semiconductor ingot into wafers is disclosed. A starting wire, which is an iron or iron alloy wire plated with copper or copper alloy, is drawn into a fine wire in a finish drawing step. Subsequently, copper or copper alloy plating is removed from the fine wire surface through chemical polishing with an acid treatment solution or a like solution, physical polishing with polishing cloth or the like, or electropolishing, or through combined polishing thereof. The method makes it possible to manufacture wire having excellent quality characteristics without raising a problem such as metal contamination of product wafers sliced from the ingot.

11 Claims, 7 Drawing Sheets

METHOD OF MANUFACTURING WIRE FOR USE IN A WIRE SAW AND WIRE FOR USE IN A WIRE SAW

BACKGROUND OF THE INVENTION

1. Field of the Invention

The present invention relates to an improvement on a method of manufacturing wire for use in a wire saw used for slicing, for example, a semiconductor ingot and to an improvement on wire for use in a wire saw.

2. Description of the Related Art

Conventionally, there has been known a wire saw for slicing many wafers from a semiconductor ingot simultaneously. In the wire saw, a semiconductor ingot is pressed against a fine wire such as a hard steel wire or a piano wire which is being fed reciprocatively or unidirectionally while abrasive grain slurry is fed to a contact portion between the wire and the ingot.

A wire made of an iron or iron alloy wire described in, for example, JIS G 3506 and JIS G 3502 is used as a starting wire which is formed into a wire for use in a wire saw. Such a starting wire is generally plated with copper or copper alloy.

The reason for plating a starting wire with copper or copper alloy is to impart a corrosion preventive effect and to impart a lubricating effect during a drawing process in which the starting wire is passed through several dies having different sizes of holes so as to be drawn in several steps. When a starting wire not plated with copper or copper alloy is drawn through a die hole to be drawn, not only does a drawing rate significantly decrease due to poor lubrication between the starting wire and the die, but also there are formed on the wire surface many scratches, which impair quality characteristics that a wire saw wire is required to have, such as tensile strength. Thus, this lubricating effect is particularly important.

As shown in FIG. 7, a starting wire plated with copper or copper alloy is fed from a starting wire reel 51 and drawn into a wire having a predetermined diameter in a finish drawing step. The thus-drawn wire is taken up onto a product take-up reel bobbin 52 for later use in a wire saw.

However, when such a wire plated with copper or copper alloy is used to slice a semiconductor ingot, not only does copper or copper alloy plating exfoliate from the wire surface during slicing and accumulate in collected abrasive grain slurry, but also copper or other metallic impurities contained in copper or copper alloy plating directly contact the sliced surface of the semiconductor ingot, resulting in contaminated product wafers. Copper has a greater coefficient of diffusion within silicon than does iron, which is the material used for the wire. Therefore, when semiconductor silicon is contaminated with copper, copper is highly likely to diffuse from the sliced surface into the bulk of a silicon wafer due to heat generated by slicing friction between a wire saw and a silicon ingot. Thus, product wafers are difficult to be decontaminated by merely cleaning the surface thereof.

There is known a method of drawing wire not plated with copper or copper alloy as disclosed in, for example, Japanese Patent Application Laid-Open (kokai) No. 5-16066, wherein a starting wire of high-carbon steel is decarburized before drawing so as to convert the region ranging from the surface to a depth of tens of micrometers into soft ferritic structure. This method improves drawing workability, but has a drawback of yielding instable mechanical characteristics due to decarburization. Accordingly, this method is not applicable to manufacture of a wire saw wire which is required to have a certain high tensile strength.

Thus, there has been eager demand for a method of manufacturing at low cost wire for use in a wire saw without adversely effecting quality characteristics which the wire saw wire is required to have and without raising a problem such as metal contamination during a slicing step.

SUMMARY OF THE INVENTION

The present invention has been accomplished to solve the above-mentioned problems, and it is an object of the invention to provide a method of manufacturing wire for use in a wire saw used for slicing, for example, a semiconductor ingot, which method makes it possible to manufacture wire having excellent quality characteristics without raising a problem such as metal contamination of product wafers sliced from the ingot.

Another object of the present invention is to provide wire for use in a wire saw which is manufactured in accordance with the method of the present invention.

To achieve the above objects, the present invention provides a method of manufacturing wire for use in a wire saw, wherein after an iron or iron alloy wire plated with copper or copper alloy undergoes finish drawing, copper or copper alloy plating is removed.

Since an iron or iron alloy wire plated with copper or copper alloy undergoes finish drawing, the wire is well lubricated during finish drawing, resulting in reduced likelihood of the wire surface being scratched. Consequently, quality characteristics required of a wire saw wire are not impaired. Since the copper or copper alloy plating of the thus-drawn wire is removed in a stripping step before the wire is used in a wire saw, product wafers are prevented from being contaminated with copper or other metallic impurities contained in copper or copper alloy plating.

Preferably, the stripping step directly follows the finish drawing step so as to establish a continuous process starting from the drawing step and ending at the stripping step. However, drawing and stripping may be performed separately.

Preferably, copper or copper alloy plating is removed through chemical polishing.

Chemical polishing is a method of removing copper or copper alloy plating through use of a chemical polishing solution. Examples of such a chemical polishing solution include sulfuric acid/hydrogen peroxide-based acid treatment solutions, sulfuric acid/water-based acid treatment solutions, sulfuric acid/sodium dichromate-based acid treatment solutions, ammonium persulfate/water-based treatment solutions, sulfuric acid/nitric acid-based acid treatment solutions, sulfuric acid/hydrochloric acid/nitric acid-based acid treatment solutions, sodium cyanide/hydrogen peroxide-based acid treatment solutions, sulfuric acid/hydrochloric acid-based acid treatment solutions, ferric chloride/hydrochloric acid-based acid treatment solutions, ferric chloride/water-based treatment solutions and hydrogen peroxide/water-based acid treatment solutions.

Preferably, copper or copper alloy plating is removed through physical polishing.

Physical polishing is a method of physically removing copper or copper alloy plating through contact and relative movement between wire and a polishing medium such as a grindstone or an abrasive grain-containing polishing cloth. A method utilizing kinetic energy of abrasive grains such as sandblasting may also be applicable.

Preferably, copper or copper alloy plating is removed through electropolishing.

Electropolishing is a method of electrochemically removing copper or copper alloy plating in an electrolyte such as NaCl, NaClO$_3$, or NaNO$_3$. Copper or copper alloy plating is removed through elution in accordance with a reverse principle of electroplating.

Preferably, chemical polishing, physical polishing, and electropolishing are arbitrarily combined to remove copper or copper alloy plating.

The present invention also provides wire for use in a wire saw obtained by steps of drawing an iron or iron alloy wire plated with copper or copper alloy and removing copper or copper alloy plating from the thus-drawn wire.

DESCRIPTION OF THE PREFERRED EMBODIMENTS

Embodiments of the present invention will now be described in detail with reference to the drawings.

Before describing a method of manufacturing wire for use in a wire saw, the structure of a wire saw apparatus will schematically be described with reference to FIGS. 5 and 6.

Figure 5:
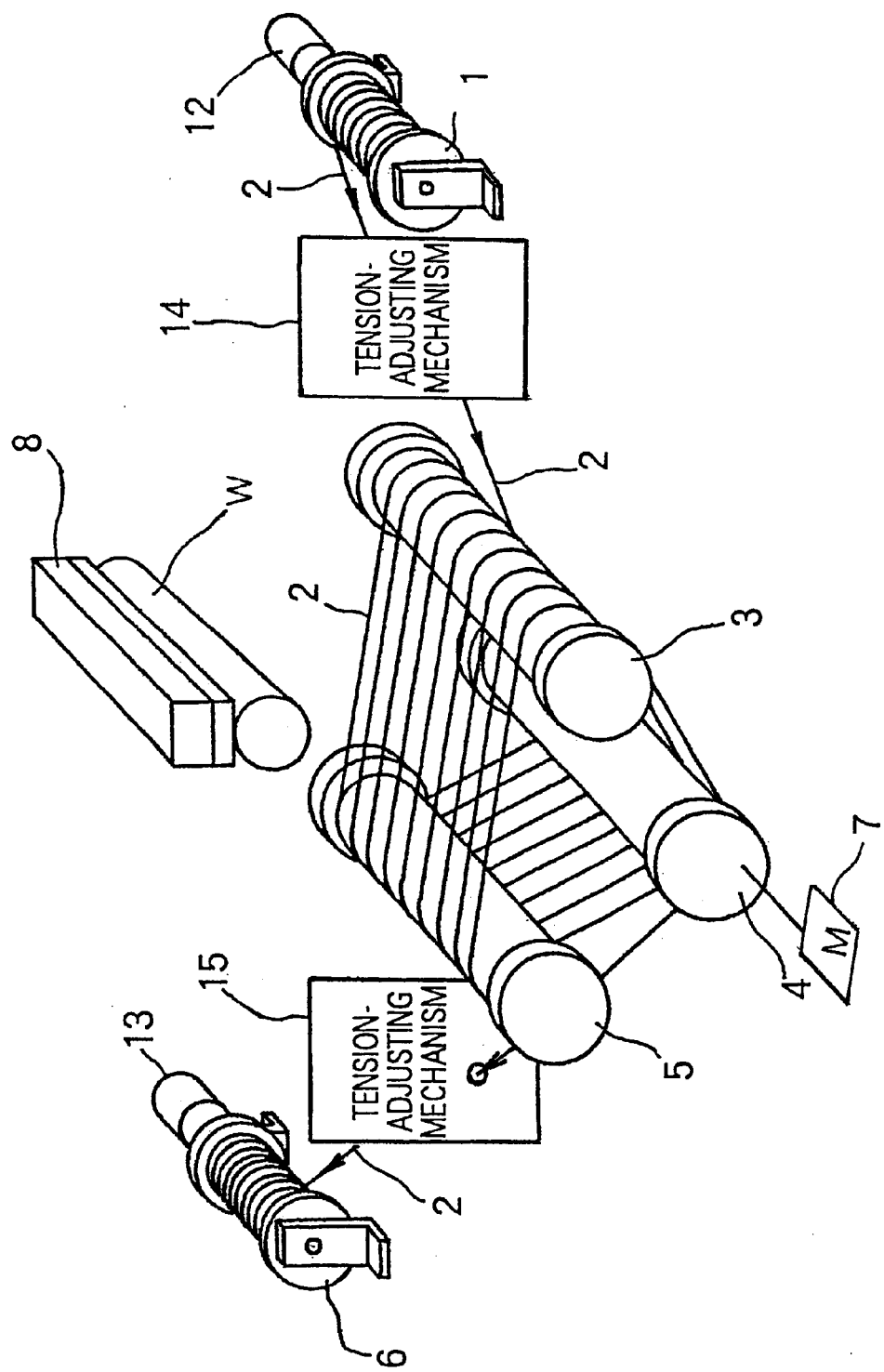
FIG. 5 is a schematic view of a wire saw apparatus.

The wire saw apparatus shown in FIG. 5 has the following structure. A single steel wire 2 taken out from a wire feed reel 1 is spirally wound at a predetermined pitch onto three resin rollers 3, 4, and 5, and then is wound onto a wire take-up reel bobbin 6. A drive motor 7 connected to the lower roller 4 rotatively drives the roller 4. Through rotation of the roller 4, the wire 2 is fed from the wire feed reel bobbin 1 to the wire take-up reel bobbin 6 at a predetermined speed.

A workpiece holder 8 is located above the upper two rollers 3 and 5. The orientation flat surface of a semiconductor ingot W is bonded onto the bottom surface of the workpiece holder 8.

Figure 6:
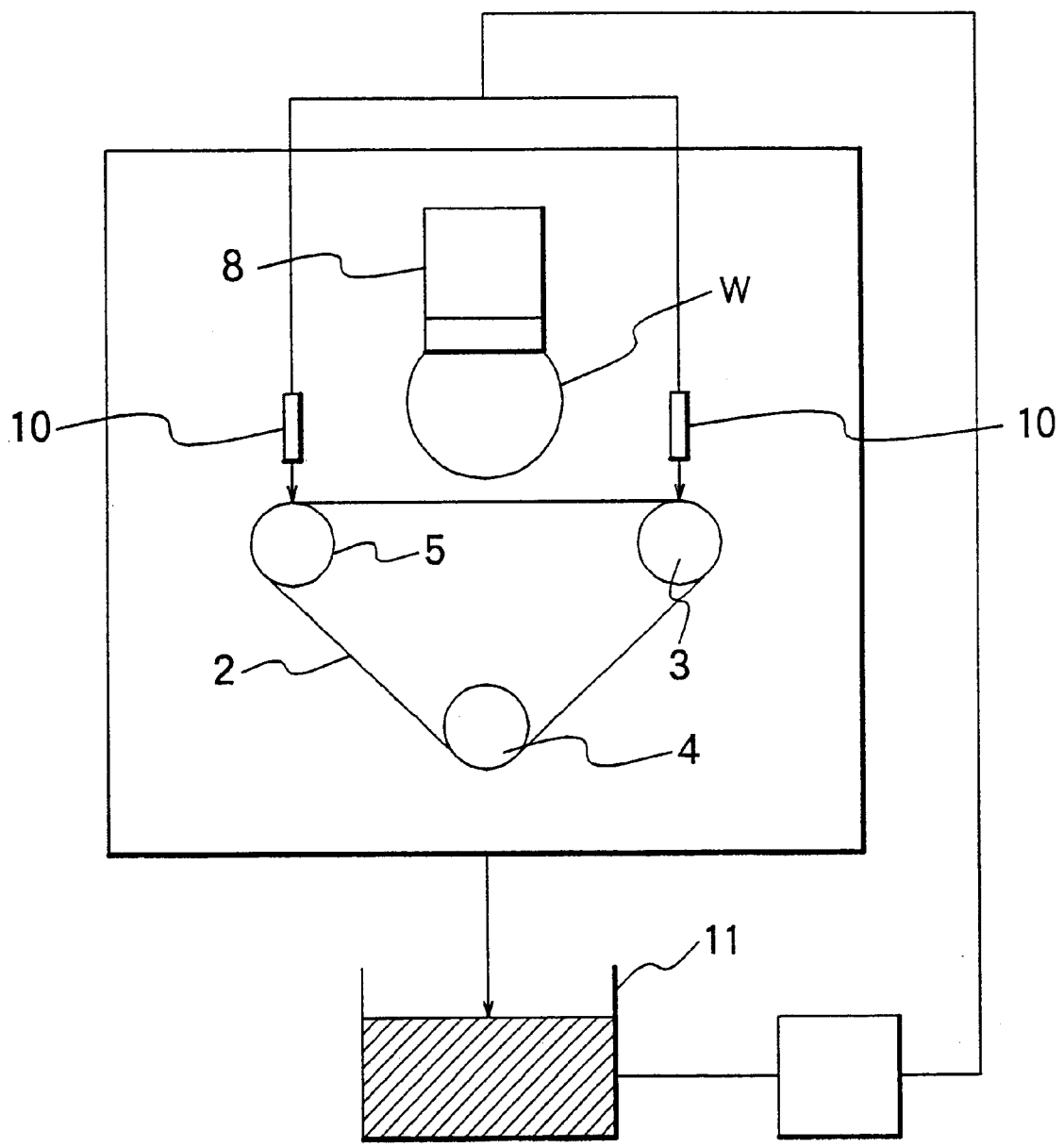
FIG. 6 is a diagrammatic front view of the wire saw apparatus.
Figure 7:
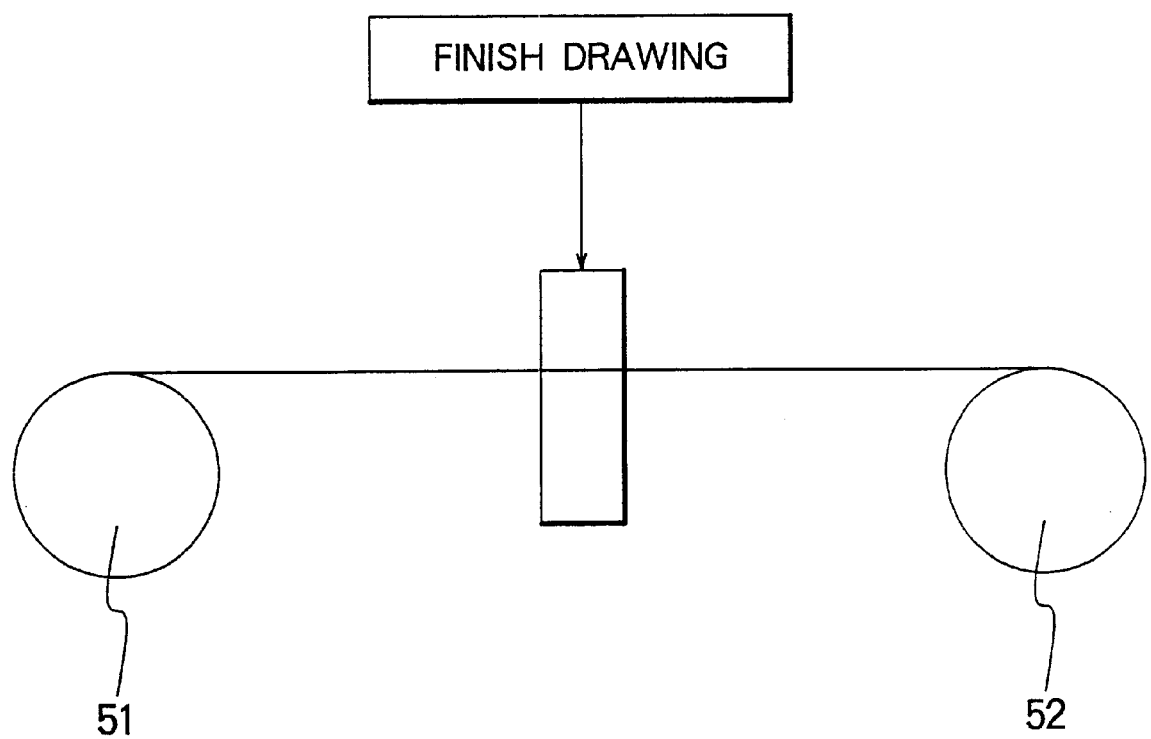
FIG. 7 is a process diagram showing a conventional method of manufacturing a wire saw wire.

Slurry feed nozzles 10 shown in FIG. 6 are disposed above the rollers 3 and 5 to be located on both sides of the workpiece holder 8. Abrasive grain slurry (prepared by suspending fine abrasive grains in oil coolant or water-soluble coolant) is discharged from the slurry feed nozzles 10 toward the wire 2. A slurry receiver 11 is located in the lower portion of the wire saw apparatus so as to receive the slurry.

As shown in FIG. 5, torque motors 12 and 13 are attached to the wire feed reel bobbin 1 and the wire take-up reel bobbin 6, respectively. Tension-adjusting mechanisms 14 and 15 are provided in the vicinity of the wire feed reel bobbin 1 and the wire take-up reel bobbin 6, respectively, so as to adjust the tension of the wire 2.

The wire saw apparatus having the above-described structure operates in the following manner. The drive motor 7 rotates the roller 4 to thereby move the wire 2 in the lengthwise direction at a predetermined speed. At the same time, while abrasive grain slurry is being discharged onto the wire 2, the semiconductor ingot W held by the workpiece holder 8 is lowered so as to contact the wire 2. As a result, through lapping effect, the semiconductor ingot W is sliced into many wafers simultaneously.

In this wire saw apparatus, when the wire 2 is plated with copper or copper alloy, not only does exfoliated copper or copper alloy accumulate in the slurry receiver 11, but also metallic impurities may adhere to the sliced surface of a wafer, resulting in contamination of the wafer.

In view of these problems, the present invention has been attained in order to manufacture the wire 2 not plated with copper or copper alloy at low cost.

Figure 1:
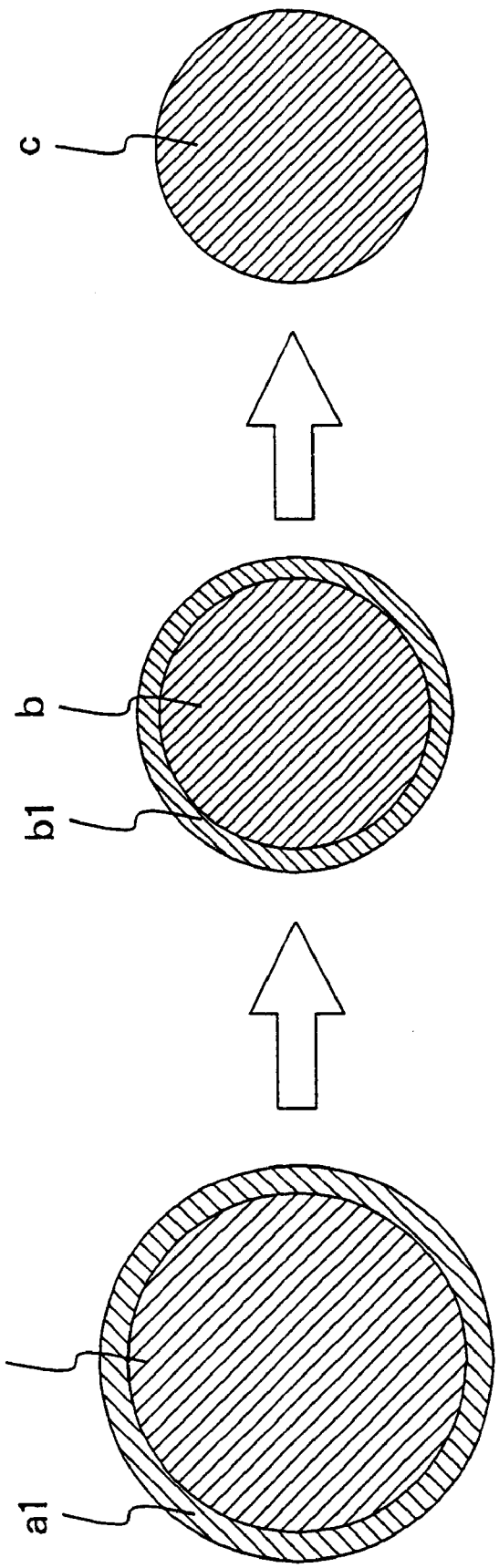
FIG. 1 is a diagram showing a change of the cross-section of a wire saw wire manufactured in accordance with a method of the present invention.

FIG. 1 shows a change of the cross-section of a wire saw wire manufactured in accordance with the method of the present invention. A wire a is drawn through use of dies into a fine wire b having a predetermined diameter in a finish drawing step. In this case, since the wire a is covered with a copper or copper alloy plating layer $a_1$, it is smoothly drawn through a die hole. Thus, a drawing rate can be maintained at a relatively high level, and the thus-formed fine wire b can maintain good quality characteristics including tensile strength.

Subsequently, the copper or copper alloy plating layer b1 is removed from the fine wire b to thereby form a stripped wire c. The thus-stripped wire c is used as the wire 2 of the above-described wire saw apparatus, thereby preventing contamination with metallic impurities in a slicing step.

Examples of a stripping process will now be described with reference to FIGS. 2 to 4.

Figure 2:
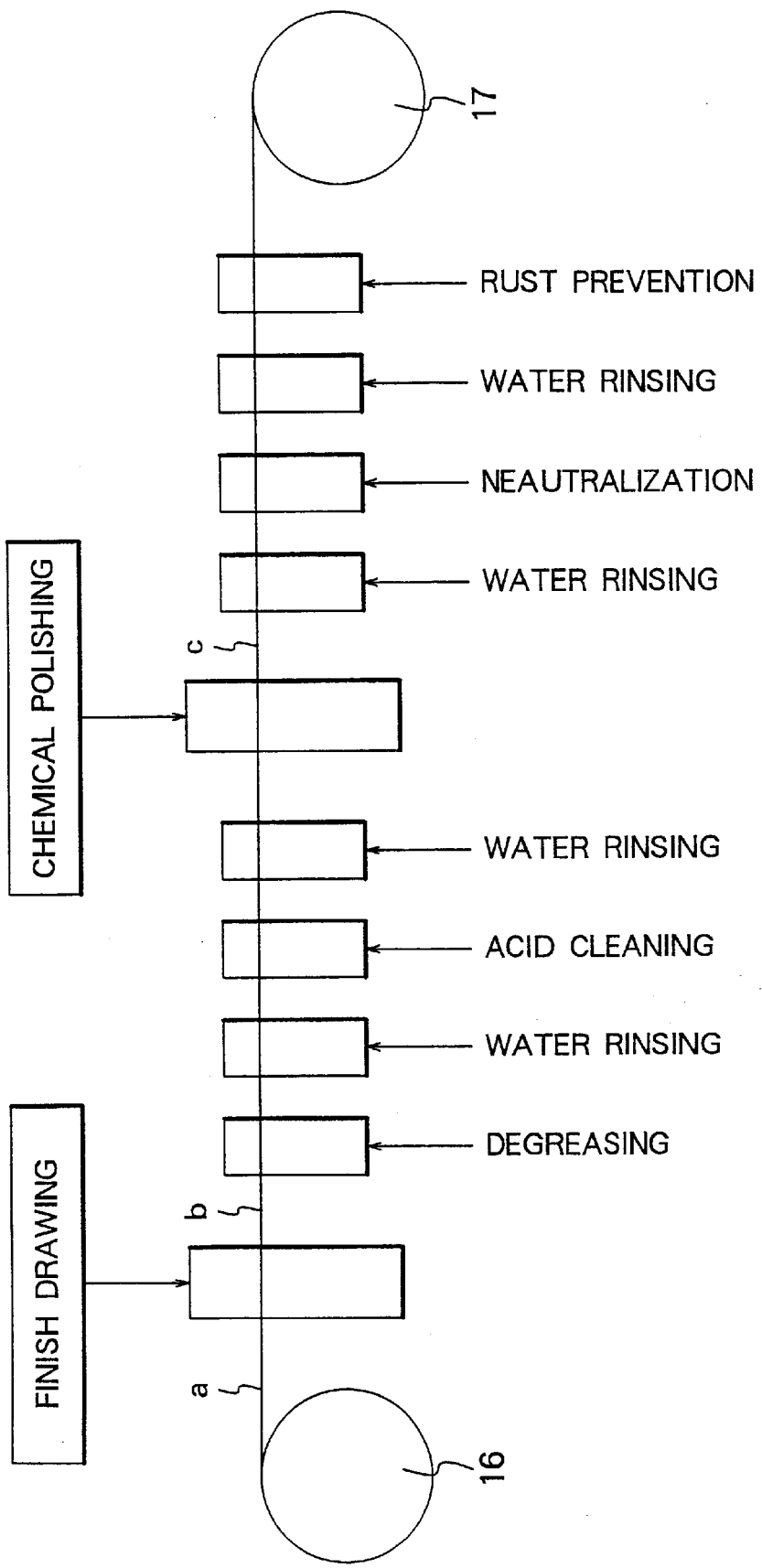
FIG. 2 is a process diagram showing a method of manufacturing a wire saw wire through use of chemical polishing according to the present invention.

FIG. 2 shows an example of the step of stripping through chemical polishing.

In this case, a starting wire a from a starting wire reel 16 is drawn to a fine wire b in a finish drawing step. The fine wire b sequentially undergoes degreasing, water rinsing, acid cleaning, and water rinsing. Subsequently, copper or copper alloy plating is removed from the fine wire b in a chemical polishing step. The thus-stripped wire c sequentially undergoes water rinsing, neutralization, water rinsing, and rust prevention, and is then taken up onto a product take-up reel 17.

In this chemical polishing, copper or copper alloy plating is removed through use of a chemical polishing solution. Examples of such a chemical polishing solution include sulfuric acid/hydrogen peroxide-based acid treatment solutions, sulfuric acid/water-based treatment solutions, sulfuric acid/sodium dichromate-based acid treatment solutions, ammonium persulfate/water-based treatment solutions, sulfuric acid/nitric acid-based acid treatment solutions, sulfuric acid/hydrochloric acid/nitric acid-based acid treatment solutions, sodium cyanide/hydrogen peroxide-based acid treatment solutions, sulfuric acid/hydrochloric acid-based acid treatment solutions, ferric chloride/hydrochloric acid-based acid treatment solutions, ferric chloride/water-based treatment solutions and hydrogen peroxide/water-based acid treatment solutions.

Figure 3:
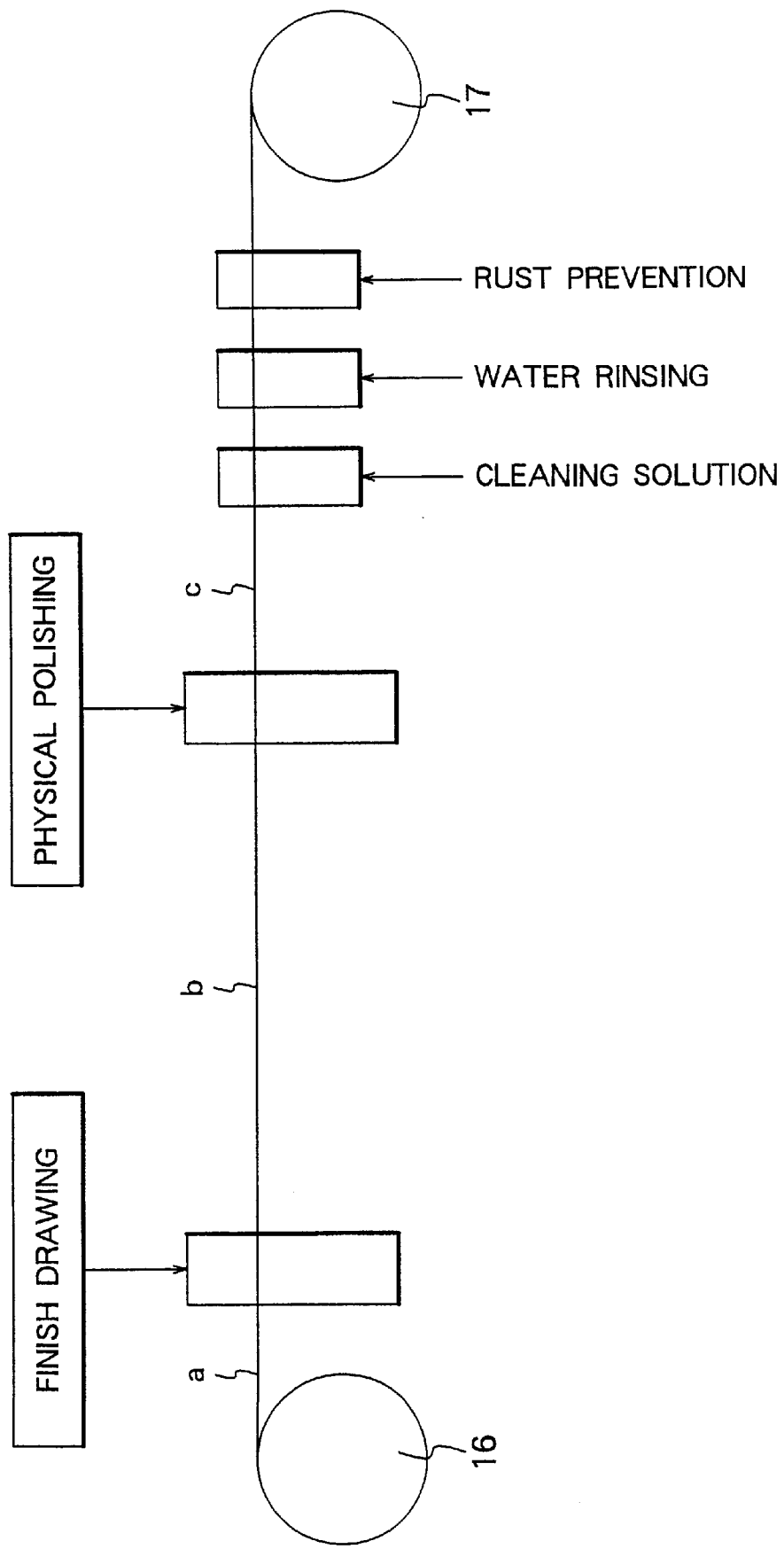
FIG. 3 is a process diagram showing a method of manufacturing a wire saw wire through use of physical polishing according to the present invention.

FIG. 3 shows an exemplified step of stripping through physical polishing.

In this case, a starting wire a from a starting wire reel 16 is drawn to a fine wire b in a finish drawing step. Subsequently, copper or copper alloy plating is removed from the fine wire b in a physical polishing step. The thus-stripped wire c sequentially undergoes cleaning with a cleaning solution, water rinsing, and rust prevention, and is then taken up onto a product take-up reel 17.

This physical polishing step employs grindstone, abrasive grain-containing polishing cloth, sandblasting, or the like to remove copper or copper alloy plating. In order to prevent physical polishing from scratching the wire surface, the grindstone and abrasive grains employed are of a fine type.

Figure 4:
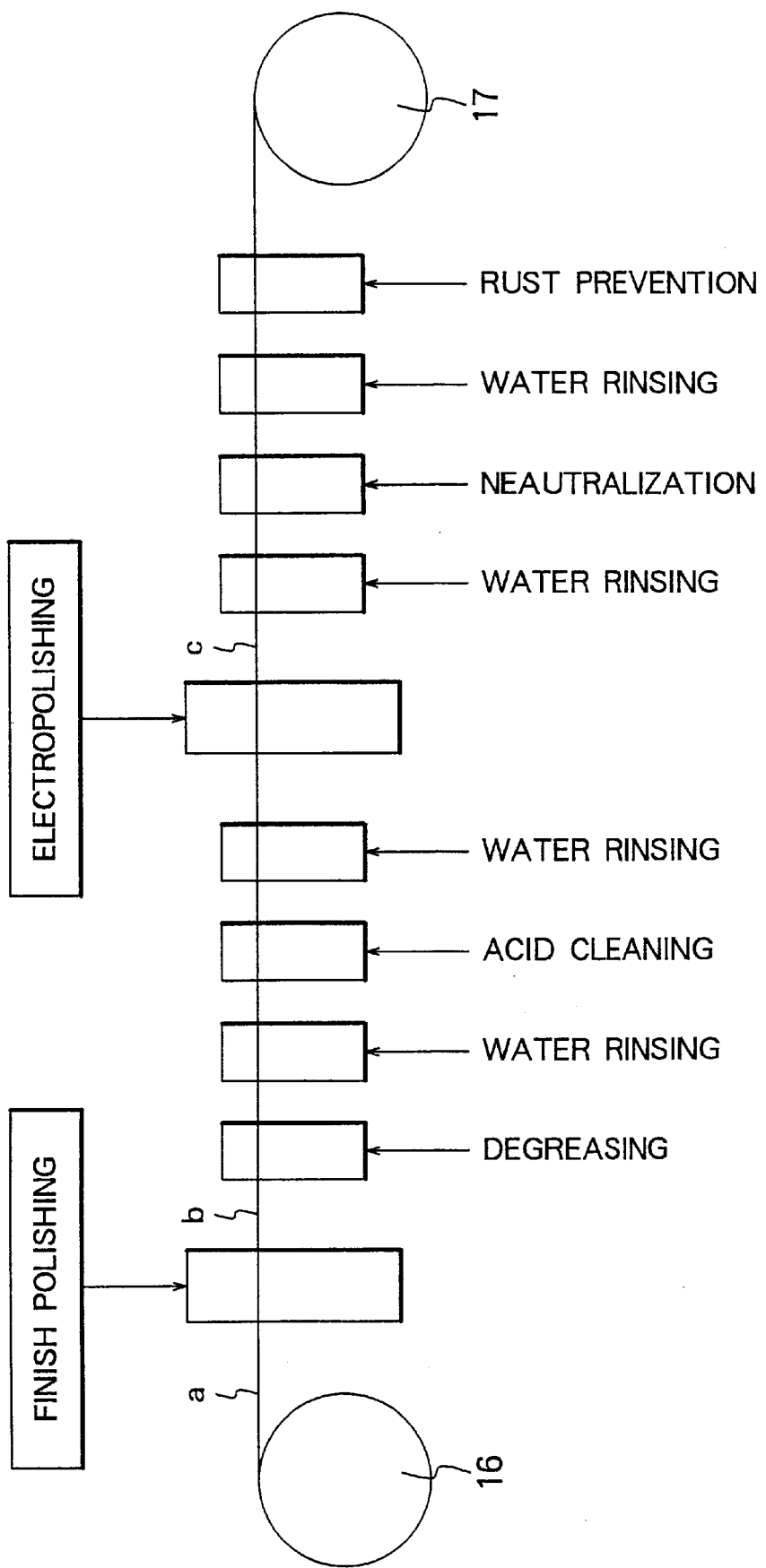
FIG. 4 is a process diagram showing a method of manufacturing a wire saw wire through use of electropolishing according to the present invention.

FIG. 4 shows an exemplified step of stripping through electropolishing.

In this case, a starting wire a from a starting wire reel 16 is drawn to a fine wire b in a finish drawing step. The fine wire b sequentially undergoes degreasing, water rinsing, acid cleaning, and water rinsing. Subsequently, copper or copper alloy plating is removed from the fine wire b in an electropolishing step. The thus-stripped wire c sequentially undergoes water rinsing, neutralization, water rinsing, and rust prevention, and is then taken up onto a product take-up reel 17.

In the electropolishing step, copper or copper alloy plating is removed through elution in accordance with a reverse principle of electroplating through use of an electrolyte such as NaCl, $NaClO_3$, or $NaNO_3$.

Chemical polishing, physical polishing, and electropolishing described above may be arbitrarily combined. For example, plating is roughly removed by physical polishing, and subsequently remaining plating is completely removed by chemical polishing, or on the contrary chemical polishing for rough removal and physical polishing for finish removal.

EXAMPLES

The present invention will next be described by way of example, which should not be construed as limiting the invention.

EXAMPLE 1

A brass-plated wire for use in a wire saw, which was drawn to a fine wire in a finish drawing step, was stripped by the chemical polishing method of the present invention using an $H_2SO_4/H_2O_2$-based (sulfuric acid/hydrogen peroxide-based) chemical polishing solution. Results of polishing are shown below in Table 1.

TABLE 1

| Sample | Brass-plated wire (diameter: 180 μm) |
|---|---|
| Composition of chemical polishing solution | $H_2SO_4$: 4 to 5% <br> $H_2O_2$: 7 to 8% <br> Additives: 2 to 3% <br> Water: 84 to 87% |
| Chemical polishing temperature | Room temperature to 40° C. |
| Chemical polishing time | Within 1 min |
| Before chemical polishing | Brass plating thickness: 0.2 μm <br> Brass plating weight: <br> 9.3 g/2000 g of wire |
| After chemical polishing | No metallic gloss of brass plating observed <br> Brass-plating removed wire dia.: 180 μm <br> Brass plating thickness: 0.0 μm <br> Brass plating weight: <br> 0.0 g/2000 g of wire |

TABLE 1-continued

| Cu on wire surface after chemical polishing | Not detected by X-ray analysis |
|---|---|
| Wire characteristics after chemical polishing | Change observed in surface gloss <br> No change observed in wire diameter and tensile strength |

When the surface of the chemically polished wire was X-ray analyzed, no copper component was detected. Also, no change was observed in the diameter and tensile strength of the wire compared to those before polishing.

EXAMPLE 2

A brass-plated wire for use in a wire saw, which was drawn to a fine wire in a finish drawing step, was stripped by the physical polishing method of the present invention under the following conditions. The wire was run at a speed of 500 m/min while a tension of 2.5 kgf was being applied to the wire. A PVA elastic grindstone, which was prepared by solidifying a dispersed mixture of GC #1000 and PVA (polyvinyl alcohol), was pressed against the running wire to thereby remove brass plating. Results of polishing are shown below in Table 2.

TABLE 2

| Sample | Brass-plated wire (diameter 180 μm) |
|---|---|
| Physical polishing conditions | Wire speed: 500 m/min <br> Wire tension: 2.5 kgf <br> Grindstone: PVA mixed with GC #1000 |
| Before physical polishing | Brass plating thickness: 0.2 μm <br> Brass-plated wire diameter: 180 μm |
| After physical polishing | No metallic gloss of brass plating observed <br> Brass-plating removed wire diameter: 179.5 μm <br> Brass plating thickness: 0.0 μm |
| Cu on wire surface after physical polishing | Not detected by X-ray analysis |
| Wire characteristics after physical polishing | Change observed in surface gloss and wire diameter <br> No change observed in tensile strength |

When the surface of the physically polished wire was X-ray analyzed, no copper component was detected. Also, no change was observed in the tensile strength of the wire compared to that before polishing.

EXAMPLE 3

A brass-plated wire for use in a wire saw, which was drawn to a fine wire in a finish drawing step, was stripped by the electropolishing method of the present invention using NaCl as an electrolyte. Results of electropolishing are shown below in Table 3.

TABLE 3

| Sample | Brass-plated wire (diameter 180 μm) |
|---|---|
| Electrolyzing method | Electrolyte: NaCl <br> Electrolyte temp.: 50 to 90° C. <br> Current density: 3 to 6 A/dm$^2$ <br> Electrolyzation time: Up to 10 min |

TABLE 3-continued

| | |
|---|---|
| Before electropolishing | Brass plating thickness: 0.2 μm<br>Brass-plated wire diameter: 180 μm |
| After electropolishing | No metallic gloss of brass plating observed<br>Brass-plating removed wire diameter: 180 μm<br>Brass plating thickness: 0.0 μm |
| Cu on wire surface after electropolishing | Not detected by X-ray analysis |
| Wire characteristics after electropolishing | Change observed in surface gloss<br>No change observed in wire diameter and tensile strength |

When the surface of the electrolitically polished wire was X-ray analyzed, no copper component was detected. Also, no change was observed in the diameter and tensile strength of the wire compared to those before polishing.

As seen from Tables 1 to 3, copper or copper alloy plating can be reliably removed through chemical polishing, physical polishing, or electropolishing which follows the finish drawing step. Also, such polishing does not have an adverse effect on quality characteristics of wire. Further, these polishing methods can be performed readily and at low cost.

When the thus-stripped wire is used in a wire saw, product wafers are free from metallic contamination and the like.

The present invention is not limited to the above-described embodiments. The above-described embodiments are mere examples, and those having the substantially same structure as that described in the appended claims and providing the similar action and effects are included in the scope of the present invention.

What is claimed is:

1. A method of manufacturing wire for use in a wire saw, comprising the steps of:
    plating an iron or iron alloy wire with copper or copper alloy;
    drawing the plated wire through a plurality of drawing stages; and
    prior to using the wire in a wire saw, removing the copper or copper alloy plating by physical polishing after the finish drawing stage.

2. A method of manufacturing wire for use in a wire saw according to claim 1, wherein said copper or copper alloy plating is removed by the combined use of physical polishing and chemical polishing.

3. A method of slicing a semiconductor ingot, comprising the steps of:
    manufacturing a wire by the steps including:
        plating an iron or iron alloy wire with copper or copper alloy;
        drawing the plated wire through a plurality of drawing stages; and
        removing the copper or copper alloy plating after the finish drawing stage; and
    slicing a semiconductor ingot in a wire saw with the manufactured wire to form wafers.

4. A method of slicing a semiconductor ingot according to claim 3, wherein the copper or copper alloy plating is removed by physical polishing.

5. A method of slicing a semiconductor ingot according to claim 3, wherein the copper or copper alloy plating is removed by chemical polishing.

6. A method of slicing a semiconductor ingot according to claim 3, wherein the copper or copper alloy plating is removed by the combined use of physical polishing and chemical polishing.

7. A method of slicing a semiconductor ingot according to claim 3, wherein the semiconductor ingot is sliced to form wafers that are substantially free of copper or metallic impurities contained in the copper or copper alloy plating.

8. A method of slicing a semiconductor ingot, comprising the steps of:
    providing wire manufactured by the steps including:
        plating an iron or iron alloy wire with copper or copper alloy;
        drawing the plated wire through a plurality of drawing stages; and
        removing the copper or copper alloy plating after the finish drawing stage; and
    slicing a semiconductor ingot in a wire saw with the wire to form wafers that are substantially free of copper or metallic impurities contained in the copper or copper alloy plating.

9. A method of slicing a semiconductor ingot according to claim 8, wherein the copper or copper alloy plating is removed by physical polishing.

10. A method of slicing a semiconductor ingot according to claim 8, wherein the copper or copper alloy plating is removed by chemical polishing.

11. A method of slicing a semiconductor ingot according to claim 8, wherein the copper or copper alloy plating is removed by the combined use of physical polishing and chemical polishing.

* * * * *